(12) United States Patent
Gehrke et al.

(10) Patent No.: US 10,818,034 B1
(45) Date of Patent: Oct. 27, 2020

(54) CONCEALED FIDUCIAL MARKERS FOR VEHICLE CAMERA CALIBRATION

(71) Applicant: Ford Global Technologies, LLC, Dearborn, MI (US)

(72) Inventors: Mark Gehrke, Ypsilanti, MI (US); Jonathan Diedrich, Carleton, MI (US); Brian Bennie, Sterling Heights, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/450,449

(22) Filed: Jun. 24, 2019

(51) Int. Cl.
  *H04N 7/18* (2006.01)
  *G06T 7/80* (2017.01)
  *B60R 1/00* (2006.01)
  *H04N 5/33* (2006.01)

(52) U.S. Cl.
  CPC ............. *G06T 7/80* (2017.01); *B60R 1/00* (2013.01); *H04N 5/33* (2013.01); *B60R 2300/103* (2013.01); *B60R 2300/402* (2013.01); *G06T 2207/10048* (2013.01); *G06T 2207/30208* (2013.01); *G06T 2207/30248* (2013.01)

(58) Field of Classification Search
  CPC ... H04N 7/18; H04N 5/33; G06T 7/80; G06T 2207/10048; G06T 2207/30208; G06T 2207/30248; B60R 1/00; B60R 2300/103; B60R 2300/402
  USPC .................................................. 348/148, 187
  See application file for complete search history.

(56) References Cited

U.S. PATENT DOCUMENTS

| | | | |
|---|---|---|---|
| 8,374,821 B2 * | 2/2013 | Rousselle | H02G 1/02 702/130 |
| 9,953,420 B2 | 4/2018 | Wolski et al. | |
| 2005/0237385 A1 | 10/2005 | Kosaka et al. | |
| 2009/0090930 A1 * | 4/2009 | Chen | B82Y 20/00 257/103 |
| 2012/0242809 A1 * | 9/2012 | White | H04N 5/332 348/51 |
| 2018/0108150 A1 | 4/2018 | Curtis | |
| 2018/0254399 A1 * | 9/2018 | Derix | H01L 33/64 |

FOREIGN PATENT DOCUMENTS

CN 108010090 A 5/2018

OTHER PUBLICATIONS

Bison et al., *Geometrical Correction and Photogrammetric Approach in Thermographic Inspection of Buildings*, Jan. 2012, 9 pages.
Broggi et al., *Self-Calibration of a Stereo Vision System for Automotive Applications*, May 2001, 6 pages.
(Continued)

Primary Examiner — Trang U Tran
(74) Attorney, Agent, or Firm — Frank Lollo; Eversheds Sutherland (US) LLP

(57) ABSTRACT

Methods and apparatus are disclosed for concealed fiducial markers for vehicle camera calibration. An example vehicle includes a frame, at least one panel coupled to the frame, and fiducial markers arranged in a predefined grid. The fiducial markers are configured to be detectable by a camera and concealed from observation by the human eye. The predefined grid of the fiducial markers is arranged to facilitate calibration of the thermal camera.

12 Claims, 4 Drawing Sheets

(56) References Cited

OTHER PUBLICATIONS

Hardawar, *Apple Relies on Frickin' Lasers to Shine Light Through Metal,* Nov. 2011, 2 pages, retrieved from https://venturebeat.com/2011/11/04/apple-laser-manufacturing/.

Harguess et al., *Infrared Stereo Calibration for Unmanned Ground Vehicle Navigation,* May 2014, 9 pages.

Shen et al., *Non-Planar Target for Multi-Camera Network Calibration,* Oct. 2009, 5 pages.

* cited by examiner

CONCEALED FIDUCIAL MARKERS FOR VEHICLE CAMERA CALIBRATION

TECHNICAL FIELD

The present disclosure generally relates to vehicle cameras and, more specifically, to concealed fiducial markers for vehicle camera calibration.

BACKGROUND

Oftentimes, cameras (e.g., digital cameras) are installed on modern vehicles to capture image(s) and/or video. In some instances, image(s) and/or video captured of an area within a cabin of a vehicle is utilized to monitor characteristics of an operator (e.g., a driver) of the vehicle. In some instances, image(s) and/or video captured of a surrounding area of a vehicle is presented to a driver (e.g., via a center console display) to facilitate the driver in operating the vehicle. In some instances, image(s) and/or video captured by a camera of a surrounding area of a vehicle are utilized by the vehicle to enable autonomous and/or semi-autonomous motive functions to be performed.

SUMMARY

The appended claims define this application. The present disclosure summarizes aspects of the embodiments and should not be used to limit the claims. Other implementations are contemplated in accordance with the techniques described herein, as will be apparent to one having ordinary skill in the art upon examination of the following drawings and detailed description, and these implementations are intended to be within the scope of this application.

Example embodiments are shown for concealed fiducial markers for vehicle camera calibration. An example disclosed vehicle includes a frame, at least one panel coupled to the frame, and thermal fiducial markers arranged on the at least one panel in a predefined grid. The thermal fiducial markers are configured to be detectable by a thermal camera and concealed from observation by a human eye. The predefined grid of the thermal fiducial markers is arranged to facilitate calibration of the thermal camera.

In some examples, the at least one panel includes at least one of a hood panel, a door panel, and a trunk panel. In some examples, the at least one panel includes at least one of an interior panel and an exterior panel.

In some examples, the thermal fiducial markers have a different thermal radiance than that of adjacent portions of the at least one panel to enable the thermal camera to detect the predefined grid. In some such examples, the thermal fiducial markers include a coating of material with a different emissivity constant than that of the adjacent portions of the at least one panel to cause the thermal fiducial markers to have the different thermal radiance than that of the adjacent portions of the at least one panel. In some such examples, the thermal fiducial markers are integrally formed with the at least one panel and have a different thickness than that of the adjacent portions of the at least one panel to cause the thermal fiducial markers to have the different thermal radiance. The different thickness causes the thermal fiducial markers to have a different temperature, and the different temperature causes the thermal fiducial markers to have the different thermal radiance. Additionally, some such examples further include an inner stamped sheet configured to provide at least one of rigidity and sound abatement to the at least one panel and spot welds for coupling the inner stamped sheet to the at least one panel. In such examples, the spot welds form the thermal fiducial markers and have a different thickness than that of the adjacent portions of the at least one panel to cause the thermal fiducial markers to have the different thermal radiance.

In some examples, the thermal fiducial markers are formed from portions of the at least one panel that are configured to collect heat from a heat source. In some such examples, the thermal fiducial markers are configured to collect heat emitted by an engine cabin to enable the thermal camera to detect the predefined grid of the thermal fiducial markers. In some such examples, the thermal fiducial markers are configured to collect heat emitted by heating elements coupled to an electrical circuit to enable the thermal camera to detect the predefined grid of the thermal fiducial markers.

In some examples, the predefined grid of the thermal fiducial markers facilitates calibration of the thermal camera by enabling the thermal camera to localize control points and solve for camera parameters. Some examples further include an electronic control unit that is configured to communicatively couple to the thermal camera, collect thermal images captured by the thermal camera, and fuse the thermal images captured by the thermal camera with images captured by other vehicle cameras. In some examples, the thermal camera includes a far infrared camera.

An example disclosed vehicle includes a frame, at least one panel coupled to the frame, and fiducial markers arranged on the at least one panel in a predefined grid. The fiducial markers are configured to be detectable by a visible-light camera and concealed from observation by a human eye. The predefined grid of the fiducial markers is arranged to facilitate calibration of the visible-light camera.

In some examples, the at least one panel includes sets of micro-holes. In such examples, the fiducial markers include light emitting diodes (LEDs) located adjacent to the sets of micro-holes. In some examples, the fiducial markers include a coating of material that is configured to polarize reflected light differently than that of adjacent portions of the at least one panel. In some examples, the predefined grid of the fiducial markers facilitate calibration of the visible-light camera by enabling the visible-light camera to localize control points and solve for camera parameters.

Some examples further include visible fiducial markers arranged on the at least one panel in a second predefined grid. In such examples, the visible fiducial markers are configured to be detectable by the visible-light camera and the human eye, and the second predefined grid is arranged on the at least one panel to facilitate calibration of the visible-light camera. In some such examples, the visible fiducial markers include outer edges of the at least one panel. In some such examples, the visible fiducial markers include one or more styling accessories located on the at least one panel.

BRIEF DESCRIPTION OF THE DRAWINGS

For a better understanding of the invention, reference may be made to embodiments shown in the following drawings. The components in the drawings are not necessarily to scale and related elements may be omitted, or in some instances proportions may have been exaggerated, so as to emphasize and clearly illustrate the novel features described herein. In addition, system components can be variously arranged, as known in the art. Further, in the drawings, like reference numerals designate corresponding parts throughout the several views.

DETAILED DESCRIPTION OF EXAMPLE EMBODIMENTS

Figure 1:
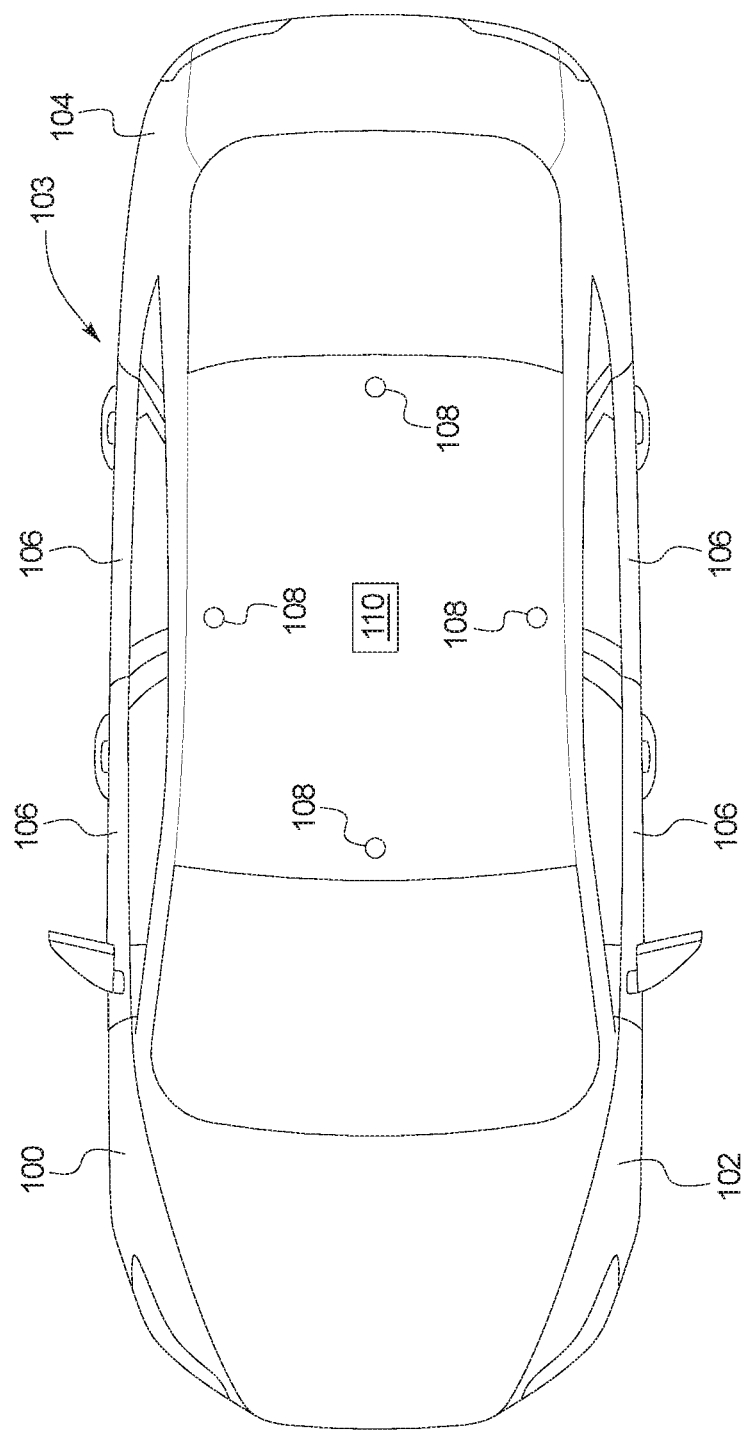
FIG. 1 illustrates an example vehicle in accordance with the teachings herein.

While the invention may be embodied in various forms, there are shown in the drawings, and will hereinafter be described, some exemplary and non-limiting embodiments, with the understanding that the present disclosure is to be considered an exemplification of the invention and is not intended to limit the invention to the specific embodiments illustrated.

Oftentimes, cameras (e.g., digital cameras) are installed on modern vehicles to capture image(s) and/or video. In some instances, image(s) and/or video captured of an area within a cabin of a vehicle is utilized to monitor characteristics of an operator (e.g., a driver) of the vehicle. In some instances, image(s) and/or video captured of a surrounding area of a vehicle is presented to a driver (e.g., via a center console display) to facilitate the driver in operating the vehicle. In some instances, image(s) and/or video captured by a camera of a surrounding area of a vehicle are utilized by the vehicle to enable autonomous and/or semi-autonomous motive functions to be performed.

Fiducial markers are sometimes used to calibrate cameras installed on vehicles. For instances, cameras installed on a vehicle may be calibrated to enable images captured by those cameras to be accurately fused together and/or with other sensor data. Further, cameras installed on a vehicle may be calibrated to enable images captured by those cameras to be displayed to an operator in an augmented reality display (e.g., a heads-up display, a video screen, etc.) Oftentimes, fiducial markers are arranged in a two-dimensional checkered grid in a laboratory setting. Such checkered grids are configured to take up a significant portion of the field-of-view of the camera to increase the accuracy of the calibration. However, it is potentially impractical and cost prohibitive to calibrate cameras of a vehicle in such a laboratory setting. Additionally, it is potentially undesirable for a user to have a large checkered grid on a vehicle. Furthermore, utilizing a relatively small object, such as an antenna of a vehicle, may potentially be too small of a marker to accurately calibrate a camera.

Example apparatus disclosed herein include a predefined grid of fiducial markers for calibrating a camera installed on a vehicle. The grid of fiducial markers are located along a surface of the vehicle and are concealed from observation by the human eye. The grid of fiducial markers enable calibration of a camera installed during assembly in a factory setting and/or of a camera (e.g., an aftermarket camera) later installed by a user of the vehicle without negatively affecting the aesthetic attractiveness of the vehicle. For example, the grid of fiducial markers enable calibration during repair, replacement, and/or servicing of a camera.

As used herein, a "fiducial marker" refers to an object that is positioned at a known, fixed location to be a point-of-reference for calibrating a camera when the object is within a field-of-view of the camera. As used herein, a "thermal fiducial marker" refers to a fiducial marker that is configured to calibrate a camera that captures thermal images (e.g., a thermal camera, a far infrared camera, etc.). As used herein, a "visual fiducial marker" refers to a fiducial marker that is configured to calibrate a camera that captures visual images (e.g., a visible-light camera).

In examples disclosed herein, fiducial markers are located at known, fixed points on a panel and/or another surface (e.g., exterior or interior) of a vehicle. The fiducial markers are unobservable by, camouflaged for, and/or concealed from observation by the human eye. A camera is calibrated based on where the fiducial markers are located within pixels of an image captured by the camera. The fiducial markers include thermal fiducial markers and visual fiducial markers. Thermal fiducial markers are configured to calibrate thermal cameras and may be formed by (1) machining a thicker or thinner layer of thermally conductive material, (2) forming spot welds of thermally conductive material, (3) coating thermally conductive material with a layer of material with a different emissivity constant than surrounding material, and/or (4) configuring a thermal conduit to thermally conductive material in a predetermined pattern. Visual fiducial markers are configured to calibrate visible-light cameras and may be formed (1) by LEDs behind micromachined holes of a panel and/or (2) via a coating that alters the polarization of reflected light.

Turning to the figures, FIG. 1 illustrates an example vehicle 100 in accordance with the teachings herein. The vehicle 100 may be a standard gasoline powered vehicle, a hybrid vehicle, an electric vehicle, a fuel cell vehicle, and/or any other mobility implement type of vehicle. The vehicle 100 includes parts related to mobility, such as a powertrain with an engine, a transmission, a suspension, a driveshaft, and/or wheels, etc. The vehicle 100 may be non-autonomous, semi-autonomous (e.g., some routine motive functions controlled by the vehicle 100), or autonomous (e.g., motive functions are controlled by the vehicle 100 without direct driver input).

The vehicle 100 of the illustrated example includes a plurality of panels coupled to a frame 103. For example, the panels of the vehicle 100 include a hood panel 102, a trunk panel 104 (sometimes referred to as a tailgate panel, a liftgate panel, or a gate panel), and a plurality of door panels 106. For example, each of the doors of the vehicle 100 includes a respective one of the door panels 106. Additionally or alternatively, the vehicle 100 may include other panel(s) that are coupled to the frame 103 along an exterior and/or interior of the vehicle 100. For example, the vehicle 100 may include interior door panels and/or a dash panel located within a cabin of the vehicle 100.

In the illustrated example, one or more cameras 108 are located throughout the vehicle 100. In some examples, one or more of the cameras 108 includes a visible-light camera and/or other camera type that is configured to capture visible image(s) and/or video. Additionally or alternatively, one or more of the cameras 108 includes a thermal camera, a far infrared camera, and/or other camera type that is configured to capture thermal image(s) and/or video.

The cameras 108 of the illustrated example are configured to capture image(s) and/or video of an exterior area adjacent to the vehicle 100 and/or an interior area within a cabin of the vehicle 100. For example, one or more of the cameras 108 are configured to capture image(s) and/or video of surrounding area of the vehicle 100 to enable nearby object(s) to be identified and located for the performance of autonomous motive functions by the vehicle 100. Additionally or alternatively, the captured image(s) and/or video of the surrounding area are presented via a display of the vehicle 100 to facilitate a driver in operating the vehicle 100 within the surrounding area. Each of the cameras 108 that monitor a surrounding area of the vehicle may be positioned within an interior and/or along an exterior of the vehicle 100. Further, in some examples, the one or more of the cameras 108 are configured to capture image(s) and/or video of an interior area of the vehicle 100 to monitor occupant(s) (e.g., an operator) and/or other object(s) located within the cabin of the vehicle 100. Each of the cameras 108 that monitor an interior area of the vehicle may be positioned within an interior and/or along an exterior of the vehicle 100.

The vehicle 100 of the illustrated example also includes an electronic control unit (ECU) 110 that is configured to monitor and control one or more subsystems of the vehicle 100. For example, the ECU 110 is a discrete sets of electronics that include their own circuit(s) (e.g., integrated circuits, microprocessors, memory, storage, etc.) and firmware, sensors, actuators, and/or mounting hardware. The ECU 110 may communicate and exchange information via a vehicle data bus. Additionally, the ECU 110 may communicate properties (e.g., status of the ECU 110, sensor readings, control state, error and diagnostic codes, etc.) to and/or receive requests from other ECUs of the vehicle 100. For example, the vehicle 100 may have dozens of the ECUs that are positioned in various locations around the vehicle 100 and are communicatively coupled to each other by the vehicle data bus.

In the illustrated example, the ECU 110 includes a camera module that is configured to communicate with and control the cameras 108 of the vehicle 100. For example, the camera module is configured to communicatively couple to the cameras 108, collect images and/or video (e.g., visible images, thermal images, etc.) captured by the cameras 108, and fuse the images and/or video captured by the cameras 108 together to facilitate operation of other system(s) of the vehicle 100. For example, the captured and/or fused images and/or video are utilized by an autonomy unit of the vehicle 100 to perform autonomous motive functions for the vehicle 100.

Each of the cameras 108 may be a genuine part, an original equipment manufacturer (OEM) part, and/or an aftermarket part. As used herein, a "genuine part" refers to a part or component of a vehicle that is supplied to a customer by a manufacturer of the vehicle. Oftentimes, genuine parts are installed in a vehicle when the vehicle is originally manufactured and sold. As used herein, an "OEM part" refers to a part or component of a vehicle that is supplied to a customer by the original equipment manufacturer of the part. As used herein, an "original equipment manufacturer" and an "OEM" refer to a manufacturer of a part of a vehicle. As used herein, an "aftermarket part" refers a part or component of a vehicle that is supplied to a customer by a manufacturer that is neither the manufacturer of the vehicle nor an original equipment manufacturer.

When each of the cameras 108 is installed on the vehicle 100, the camera 108 is calibrated to enable images captured by the camera to be accurately fused together with images of the other cameras 108 and/or other sensor data. For example, when a camera (e.g., a genuine part) is installed on the vehicle 100 by the manufacturer of the vehicle 100 at the time of manufacturing the vehicle 100, that camera is calibrated within the factory that assembles the vehicle 100. Additionally, if a camera (e.g., a genuine part, an OEM part, an aftermarket part) is installed on the vehicle 100 after the vehicle 100 has been manufactured, a user of the vehicle 100 initiates calibration of the camera upon installing the camera at a factory-recommended position and orientation.

The vehicle 100 of the illustrated example includes fiducial markers (e.g., fiducial markers 200 of FIG. 2, fiducial markers 600 of FIG. 6) that facilitate calibration of the cameras 108. For example, the fiducial markers are arranged in a large pattern on a surface of the vehicle 100 to improve the calibration of the cameras 108. The large pattern of fiducial markers creates a multiple control points to localize during the calibration process, thereby increasing the accuracy of the camera calibration. For example, to calibrate a camera, the camera is fixed to the vehicle 100 in a factory-recommended position and orientation to facilitate images of the fiducial markers that are captured by the camera to be compared to the fixed, known positions of the fiducial markers. That is, to calibrate a camera, (1) the camera is fixed to the vehicle 100 in a factory-recommended position and orientation, (2) the camera captures an image of the fiducial markers, (3) the camera and/or the ECU 110 localize the fiducial markers within the image, (4) the camera and/or the ECU 110 compares those locations to the fixed, known locations of the fiducial markers 200, (5) the camera and/or the ECU 110 solves for various camera parameters, and (6) the camera and/or the ECU 110 adjusts one or settings based on those parameters.

Figure 2:
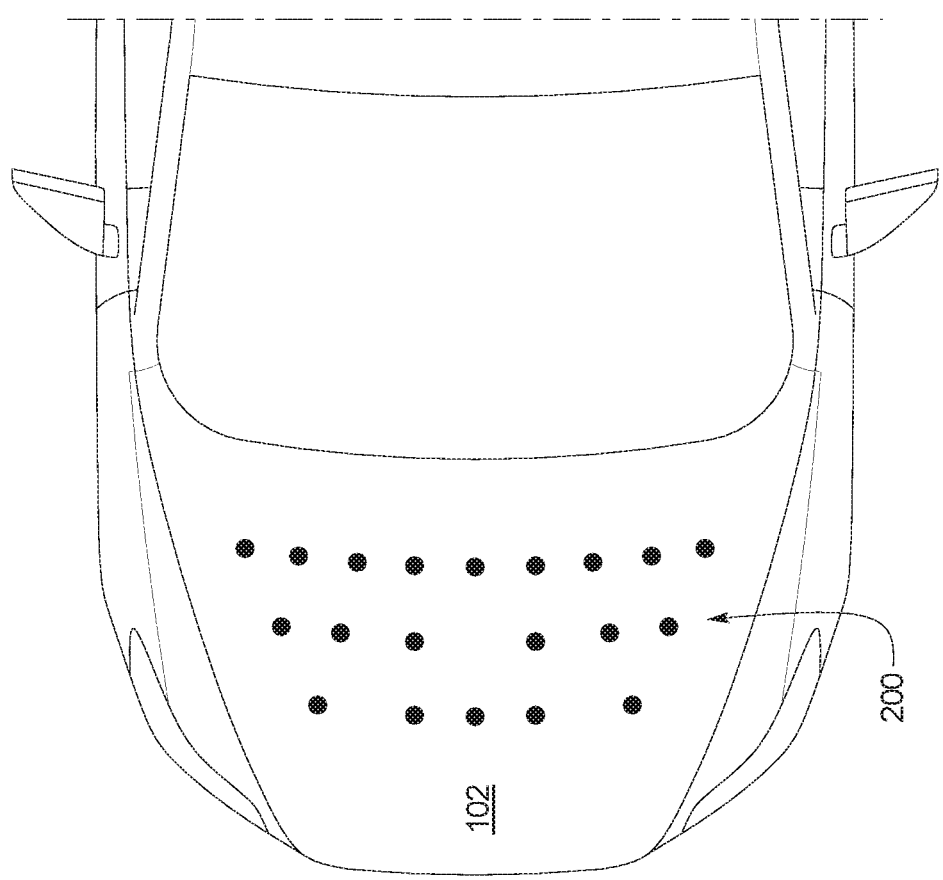
FIG. 2 depicts a top view of an example grid of fiducial markers on a panel of the vehicle of FIG. 1.

FIG. 2 depicts a top view of an example predefined grid of fiducial markers 200 arranged on the hood panel 102 of the vehicle 100 at fixed, known positions. Additionally or alternatively, the predefined grid of fiducial markers 200 is arranged on one or more other surfaces of the vehicle 100 (e.g., the trunk panel 104, one or more of the door panels 106, an interior panel, etc.).

The fiducial markers 200 of the illustrated example are arranged in a relatively large grid that takes up a significant portion of the hood panel 102 to increase the effectiveness of the fiducial markers 200 in calibrating a camera installed on the vehicle 100. That is, the predefined grid of the fiducial markers 200 facilitates calibration of a camera installed on the vehicle 100 by enabling the camera to localize multiple control points and solve for various camera parameters. Further, the fiducial markers 200 of the illustrated example are concealed from observation by the human eye such that the fiducial markers 200 do not reduce the aesthetic attractiveness of the vehicle 100.

In some examples, the fiducial markers 200 are thermal fiducial markers that are configured for calibrating thermal cameras, such as a far infrared camera. That is, the thermal fiducial markers are configured to be detectable by a thermal camera. The thermal fiducial markers are formed, at least in part, by portions of the hood panel 102 on which the thermal fiducial markers are arranged. Each of the thermal fiducial markers has a different thermal radiance than adjacent portions of the hood panel 102 to enable the thermal camera to detect the predefined grid of the thermal fiducial markers when heat is applied to and/or collected by the hood panel 102.

The amount of thermal radiance emitted by material is based on (1) an emissivity constant of the material and (2) a temperature of the material. Further, a temperature of material is affected by a thickness of the material. In turn, to have a different thermal radiance than adjacent portions of a panel, the thermal fiducial markers are configured to have a different emissivity constant or a different thickness than the adjacent portions of the panel.

In the illustrated example, by having a different emissivity constant and/or thickness, the thermal fiducial markers are configured to generate a different thermal radiance than the adjacent portions of the hood panel 102 when heat is applied to and/or collected by the hood panel 102. In turn, the thermal camera is able to detect the predefined grid of the thermal fiducial markers when heat is collected by the hood panel 102 from a heat source. In some examples, the heat source is an engine cabin. That is, the thermal fiducial markers are configured to collect heat form the engine cabin to enable the thermal camera to detect the predefined grid of the thermal fiducial markers. In some examples, the heat source includes heating elements coupled to an electrical circuit. That is, the thermal fiducial markers are configured to collect heat emitted by the heating elements to enable the thermal camera to detect the predefined grid of the thermal fiducial markers.

In some examples, the thermal fiducial markers are formed from a coating of material on the hood panel 102 that is unobservable by the human eye. The coating of material has a different emissivity constant than that of the adjacent portions of the hood panel 102 to cause the thermal fiducial markers to have a different thermal radiance than the adjacent portions of the hood panel 102. In some examples, the thermal fiducial markers are integrally formed with the hood panel 102 and have a different thickness that of adjacent portions of the hood panel 102. The different thickness of the thermal fiducial markers relative to the adjacent portions of the hood panel 102 cause the thermal fiducial markers to be a different temperature relative to that of the adjacent portions of the hood panel 102 when heat is applied. In turn, the different temperatures of the thermal fiducial markers and the adjacent portions of the hood panel 102 cause the thermal fiducial markers to have a different thermal radiance than the adjacent portions of the hood panel 102. For example, a thin layer is machined from a back surface of the hood panel 102 to form thin thermal fiducial markers (relative to adjacent portions of the hood panel 102) that are unobservable by the human eye when the hood is latched in a closed position. In other examples, the different thermal radiances are formed from spot welds that couple an inner stamped sheet (e.g., an inner stamped sheet 402 of FIG. 4).

Additionally or alternatively, the fiducial markers 200 are visual fiducial markers that are configured for calibrating visible-light cameras. That is, the visual fiducial markers are configured to be (1) detectable by a visible-light camera and (2) concealed from observation by the human eye. The visual fiducial markers are formed, at least in part, by portions of the hood panel 102 along which the thermal fiducial markers are arranged. In some examples, the visual fiducial markers are formed from a coating of material that is configured to polarize reflected light differently than that of the adjacent portions of the hood panel 102 in a manner that is concealed from observation by the human eye. In other examples, the visual fiducial markers are formed from sets of micro-holes and light emitting diodes (LEDs) located behind and/or underneath the hood panel 102. In such examples, the micro-holes (e.g., including micro-holes 504 of FIG. 5) and LEDs (e.g., including an LED 502 of FIG. 5) are (1) concealed from observation when the LEDs are inactive and (2) detectable by the light-visible camera when the LEDs are activated.

Figure 3:
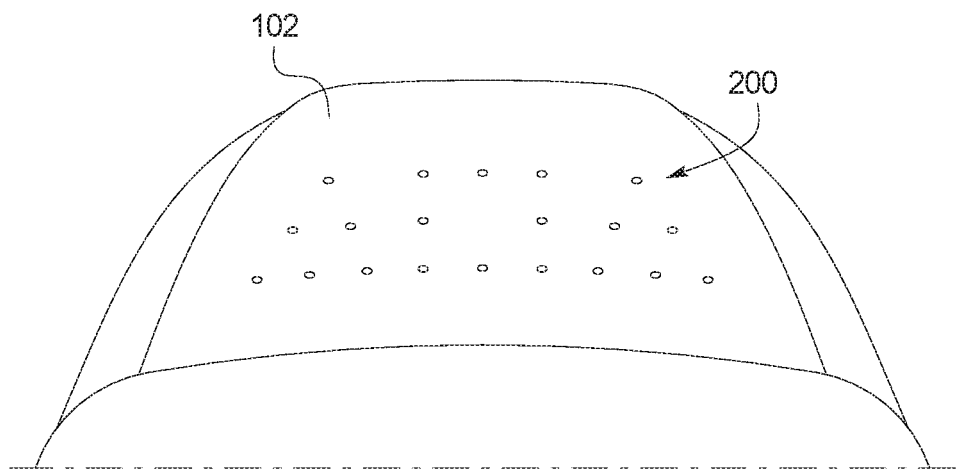
FIG. 3 further depicts the grid of fiducial markers of FIG. 2 from a perspective of a camera of the vehicle of FIG. 1.

FIG. 3 further depicts the grid of the fiducial markers 200 from a perspective of one of the cameras 108 installed adjacent to a top of a windshield of the vehicle 100. When the camera 108 is installed at a factory-recommended position and orientation, the camera 108 is to capture an image with the fiducial markers 200. Further, the camera 108 and/or the ECU 110 is configured to calibrate the camera 108 by localizing the fiducial markers 200 within the image, compare those locations to known locations of the fiducial markers 200, and subsequently solve for various camera parameters.

Figure 4:
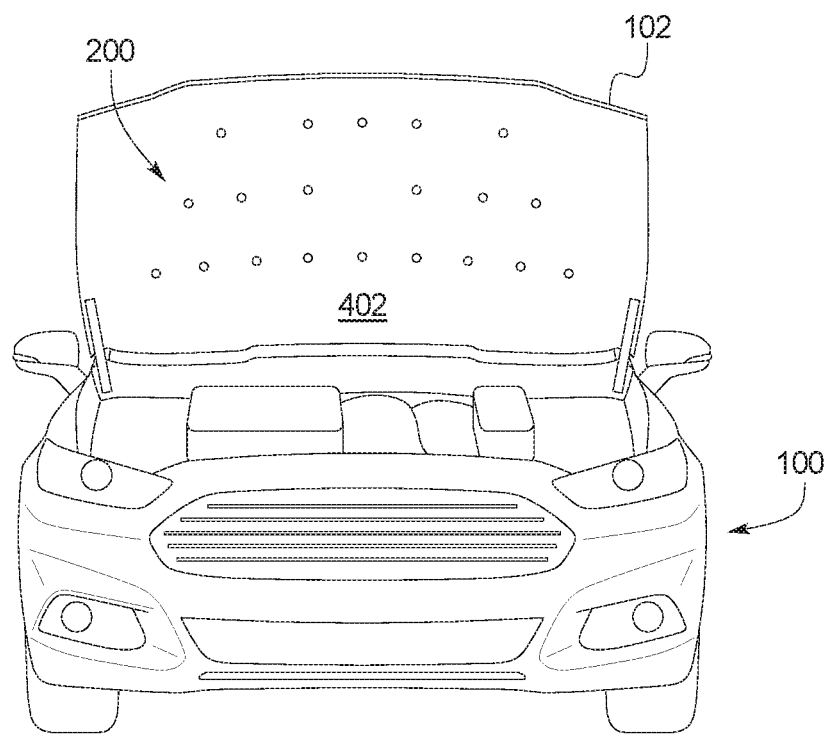
FIG. 4 further depicts the grid of fiducial markers of FIG. 2 from an underside of the panel of FIG. 2.

FIG. 4 further depicts the grid of the fiducial markers 200 from an underside of the hood panel 102 when the hood panel 102 is position in an open position away from the engine cabin. In the illustrated example, the fiducial markers 200 are formed from (1) a thin layer being machined from a back surface of the hood panel 102, (2) spot welds that couple an inner stamped sheet 402 to the hood panel 102, and/or (3) LEDs located adjacent to micro-holes of the hood panel 102. For example, the inner stamped sheet 402 is welded to the hood panel 102 to provide sound abatement and/or rigidity to the hood panel 102.

Figure 5:
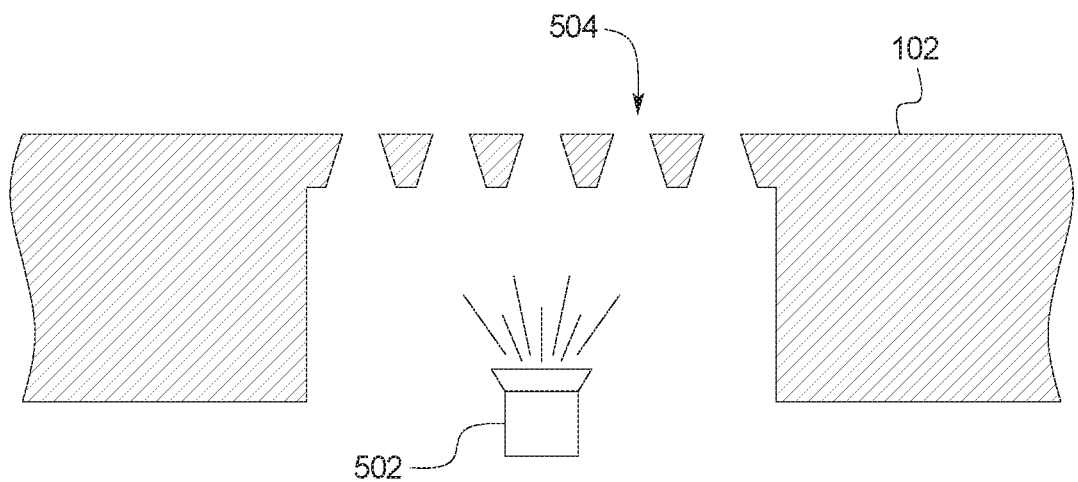
FIG. 5 depicts an example fiducial marker of the grid of fiducial markers of FIG. 2.

FIG. 5 depicts a cross-section of one of the fiducial markers 200 that is formed from an LED 502 and micro-holes 504 of the hood panel 102. The micro-holes 504 are sized such that the micro-holes 504 are undetectable from the human eye without close inspection. Further, the LED 502 is positioned relative to the micro-holes 504 such that the LED 502 is concealed from observation when the LED 502 is inactive and detectable by a light-visible camera when the LED is activated.

Figure 6:
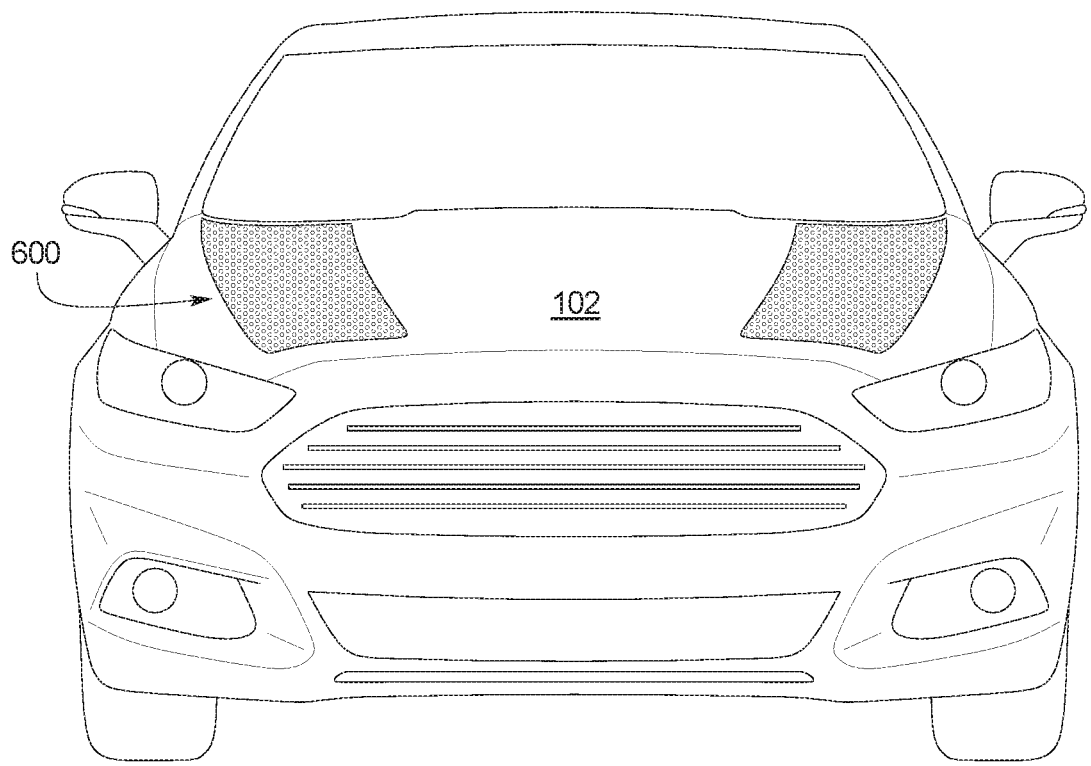
FIG. 6 depicts another example fiducial marker of the vehicle of FIG. 1.

FIG. 6 depicts fiducial markers 600 that are visible and arranged on the hood panel 102 in a predefined grid. Additionally or alternatively, the predefined grid of fiducial markers 600 is arranged on one or more other surfaces of the vehicle 100 (e.g., the trunk panel 104, one or more of the door panels 106, an interior panel, etc.) that facilitate calibration of one or more of the cameras 108 (e.g., a visible-light camera). That is, the predefined grid of the fiducial markers 600 are configured to be detectable by a visible-light camera and the human eye. In the illustrated example, the predefined grid of the fiducial markers 600 is formed from one or more styling accessories (e.g., a decal, a paint job, a power bulge, a hood scope, etc.) located on the hood panel 102 that are aesthetically pleasing. In other examples, the predefined grid of the fiducial markers 600 is formed from one or more other styling accessories (e.g., a decal, a paint job, a wing, etc.) that are located on one or more other surfaces of the vehicle 100. Further, in some examples, fiducial markers for a camera installed to the vehicle are formed from outer edges of a panel and/or other surface of the vehicle 100. For example, the fiducial markers 600 include outer edges of the hood panel 102.

In this application, the use of the disjunctive is intended to include the conjunctive. The use of definite or indefinite articles is not intended to indicate cardinality. In particular, a reference to "the" object or "a" and "an" object is intended to denote also one of a possible plurality of such objects. Further, the conjunction "or" may be used to convey features that are simultaneously present instead of mutually exclusive alternatives. In other words, the conjunction "or" should be understood to include "and/or". The terms "includes," "including," and "include" are inclusive and have the same scope as "comprises," "comprising," and "comprise" respectively.

The above-described embodiments, and particularly any "preferred" embodiments, are possible examples of implementations and merely set forth for a clear understanding of the principles of the invention. Many variations and modifications may be made to the above-described embodiment(s) without substantially departing from the spirit and principles of the techniques described herein. All modifications are intended to be included herein within the scope of this disclosure and protected by the following claims.

What is claimed is:

1. A vehicle comprising:
    a frame;
    at least one panel coupled to the frame; and
    thermal fiducial markers arranged on the at least one panel in a predefined grid, wherein the thermal fiducial markers are configured to be detectable by a thermal camera and concealed from observation by a human eye, wherein the predefined grid of the thermal fiducial markers is arranged to facilitate calibration of the thermal camera,
    wherein the thermal fiducial markers have a different thermal radiance than that of adjacent portions of the at least one panel to enable the thermal camera to detect the predefined grid, and
    wherein the thermal fiducial markers are integrally formed with the at least one panel and have a different thickness than that of the adjacent portions of the at least one panel to cause the thermal fiducial markers to have the different thermal radiance, wherein the different thickness causes the thermal fiducial markers to have a different temperature, wherein the different temperature causes the thermal fiducial markers to have the different thermal radiance.

2. The vehicle of claim 1, wherein the at least one panel includes at least one of a hood panel, a door panel, and a trunk panel.

3. The vehicle of claim 1, wherein the at least one panel includes at least one of an interior panel and an exterior panel.

4. The vehicle of claim 1, wherein the thermal fiducial markers include a coating of material with a different emissivity constant than that of the adjacent portions of the at least one panel to cause the thermal fiducial markers to have the different thermal radiance than that of the adjacent portions of the at least one panel.

5. The vehicle of claim 1, further including:
    an inner stamped sheet configured to provide at least one of rigidity and sound abatement to the at least one panel; and
    spot welds for coupling the inner stamped sheet to the at least one panel, wherein the spot welds form the thermal fiducial markers and have a different thickness than that of the adjacent portions of the at least one panel to cause the thermal fiducial markers to have the different thermal radiance.

6. The vehicle of claim 1, wherein the thermal fiducial markers are formed from portions of the at least one panel that are configured to collect heat from a heat source.

7. The vehicle of claim 6, wherein the thermal fiducial markers are configured to collect heat emitted by an engine cabin to enable the thermal camera to detect the predefined grid of the thermal fiducial markers.

8. The vehicle of claim 6, wherein the thermal fiducial markers are configured to collect heat emitted by heating elements coupled to an electrical circuit to enable the thermal camera to detect the predefined grid of the thermal fiducial markers.

9. The vehicle of claim 1, wherein the predefined grid of the thermal fiducial markers facilitates calibration of the thermal camera by enabling the thermal camera to localize control points and solve for camera parameters.

10. The vehicle of claim 1, further including an electronic control unit that is configured to communicatively couple to the thermal camera, collect thermal images captured by the thermal camera, and fuse the thermal images captured by the thermal camera with images captured by other vehicle cameras.

11. The vehicle of claim 1, wherein the thermal camera includes a far infrared camera.

12. A vehicle comprising:
    a frame;
    at least one panel coupled to the frame;
    thermal fiducial markers arranged on the at least one panel in a predefined grid, wherein the thermal fiducial markers are configured to be detectable by a thermal camera and concealed from observation by a human eye, wherein the predefined grid of the thermal fiducial markers is arranged to facilitate calibration of the thermal camera;
    an inner stamped sheet configured to provide at least one of rigidity and sound abatement to the at least one panel; and
    spot welds for coupling the inner stamped sheet to the at least one panel,
    wherein the thermal fiducial markers have a different thermal radiance than that of adjacent portions of the at least one panel to enable the thermal camera to detect the predefined grid, and
    wherein the spot welds form the thermal fiducial markers and have a different thickness than that of the adjacent portions of the at least one panel to cause the thermal fiducial markers to have the different thermal radiance.

* * * * *